Oct. 11, 1960   C. N. BOODE ET AL   2,956,252
FLUID PRESSURE TRANSDUCER
Filed March 2, 1959   2 Sheets-Sheet 1

INVENTORS.
CARL N. BOODE
ANGELO R. LOMBARDO
ROBERT M. WHITEHORN
BY Herbert E. Fidder
AGENT.

INVENTORS.
CARL N. BOODE
ANGELO R. LOMBARDO
ROBERT M. WHITEHORN

BY Herbert E. Sidder
AGENT.

United States Patent Office 2,956,252
Patented Oct. 11, 1960

2,956,252

FLUID PRESSURE TRANSDUCER

Carl N. Boode, Riverside, Angelo R. Lombardo, West Covina, and Robert M. Whitehorn, Riverside, Calif., assignors to Bourns, Inc., a corporation of California Filed Mar. 2, 1959, Ser. No. 796,664

10 Claims. (Cl. 338—42)

The present invention relates to fluid pressure transducers, and a general object of the invention is to provide a new and improved instrument of this class which is simple and inexpensive to manufacture, and at the same time, one which has exceptional performance within its operating range.

More specifically, the primary object of the present invention is to provide a precision pressure transducer of new design which is extremely compact and capable of being produced in miniature sizes.

Another object is to provide an instrument of the class described which is relatively insensitive to vibration and acceleration.

A further object of the invention is to provide a pressure transducer wherein the electrical mechanism is connected directly to a long-travel type of pressure sensing means, thereby eliminating multiplying linkage with its associated friction and complexity, and minimizing vibration problems.

Another object of the invention is to provide a pressure transducer of exceptionally high resolution and one that is substantially free of electrical "noise," which may be defined as discontinuities or disturbances in the electrical output of the instrument during movement of the wiper over the resistance element.

A further object is to provide a pressure transducer wherein the electrical mechanism is isolated from the fluid pressure media, and which is therefore adapted for use with corrosive or electrically conductive fluids.

Still another object of the invention is to provide a fluid pressure transducer having an extremely small temperature error due to expansion or contraction of the fluid pressure media with temperature change.

These objects are achieved in the present invention by providing a pressure tight case, within which is contained a sealed, double aneroid capsule type of pressure sensing means mounted on opposite sides of a central support member. The fluid pressure media is introduced into the case and acts against the outside of the pressure sensing means. The resistance element and wiper are mounted within the aneroid capsule pressure sensing means where they are isolated from the fluid pressure media. The resistance element and wiper are of a novel construction, wherein the wiper contacts the element about a 360° line of contact within a plane normal to the longitudinal axis of the element, giving greatly improved resolution and reduced noise. The element is connected directly to one of two oppositely movable ends on the aneroid capsule pressure sensing means, while the wiper is connected directly to the other movable end. This provides a long relative movement between the element and wiper within the operating range of the instrument, without the necessity of multiplying linkage.

Vibration error is minimized by dynamically balancing the two aneroid capsules so that they vibrate in synchronism, and by resiliently supporting the central support member on elastic mounts which have the characteristic of greatly attenuating the amplitude of vibration transmitted from the case to the central support member at the resonant frequency of the aneroid capsules.

The foregoing and other objects and advantages of the present invention will become apparent to those skilled in the art upon consideration of the following detailed description of the preferred embodiment thereof, reference being had to the accompanying drawings, wherein.

Figure 1:
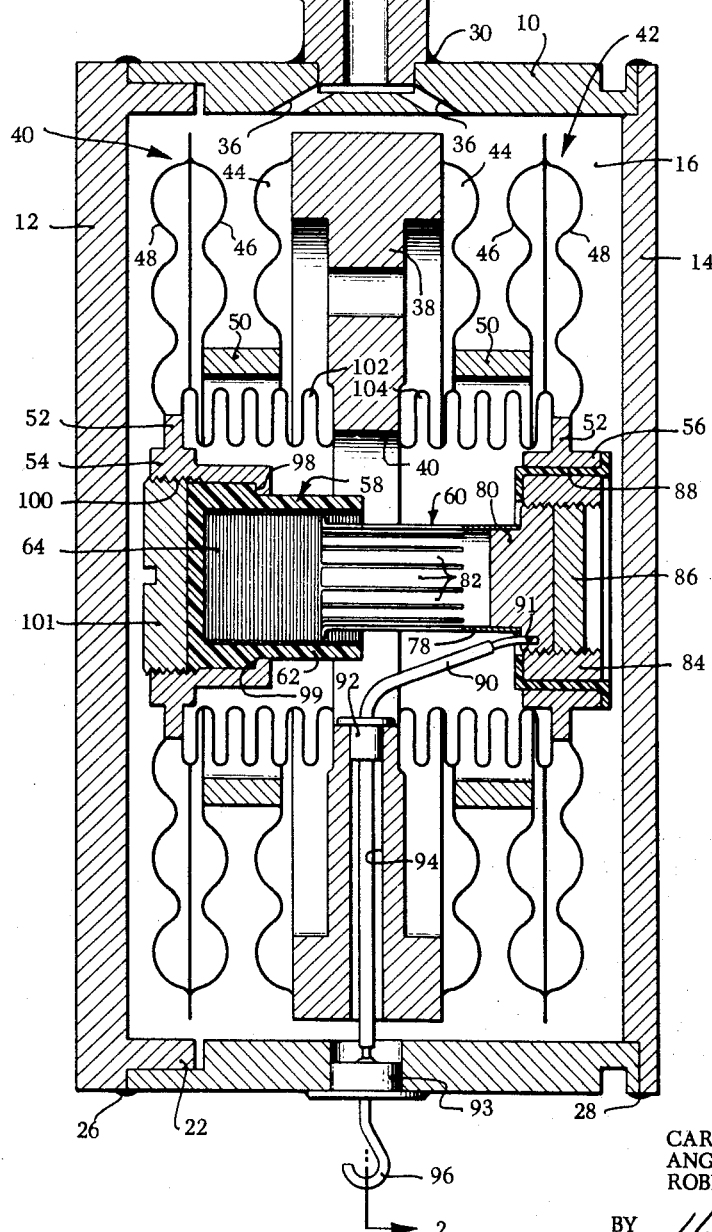
Figure 1 is a sectional view taken through a pressure transducer embodying the principles of the invention.

In the drawings, the pressure transducer embodying the principles of our invention is seen to comprise a generally cylindrical case 10 having end plates 12 and 14 which cooperate with the case to enclose a chamber 16. End plate 12 has a square base flange 18 provided with holes 20 in the four corners thereof to receive mounting bolts, and projecting from one side of the base flange 18 is an annular ring 22 which extends into a recess 24 in the case. Both of the end plates 12 and 14 are joined to the case 10 by continuous welds 26 and 28 extending circumferentially around the case. Projecting into an aperture in one side of the case 10 and welded thereto at 30 is a threaded pipe fitting 32 having a central passageway 34 which is connected by branch passageways 36 to the interior chamber 16.

Disposed centrally within the case 10 is a support member 38, which is preferably in the form of a circular disc having an aperture 40 through the center thereof. Mounted on opposite sides of the support member 38 and projecting outwardly therefrom are two aneroid capsule type of pressure sensing means 40 and 42, each of which consists of three inter-connected, centrally apertured diaphragm discs 44, 46 and 48 of thin sheet metal having concentric rings of corrugations formed therein. The inner disc 44 is welded or brazed around its outer peripheral edge to the central support member 38, while its inner edge is likewise welded or brazed to one end of a spacer ring 50. The other end of the spacer ring 50 is welded or brazed to the inner edge of the intermediate diaphragm disc 46, and the outer peripheral edge of disc 46 is welded or brazed to the outer peripheral edge of the outer disc 48. The inner edge of each of the discs 48 is welded or brazed to the outer side of a radial flange 52 projecting outwardly from one of two ring members 54 and 56.

Figures 2, 3:
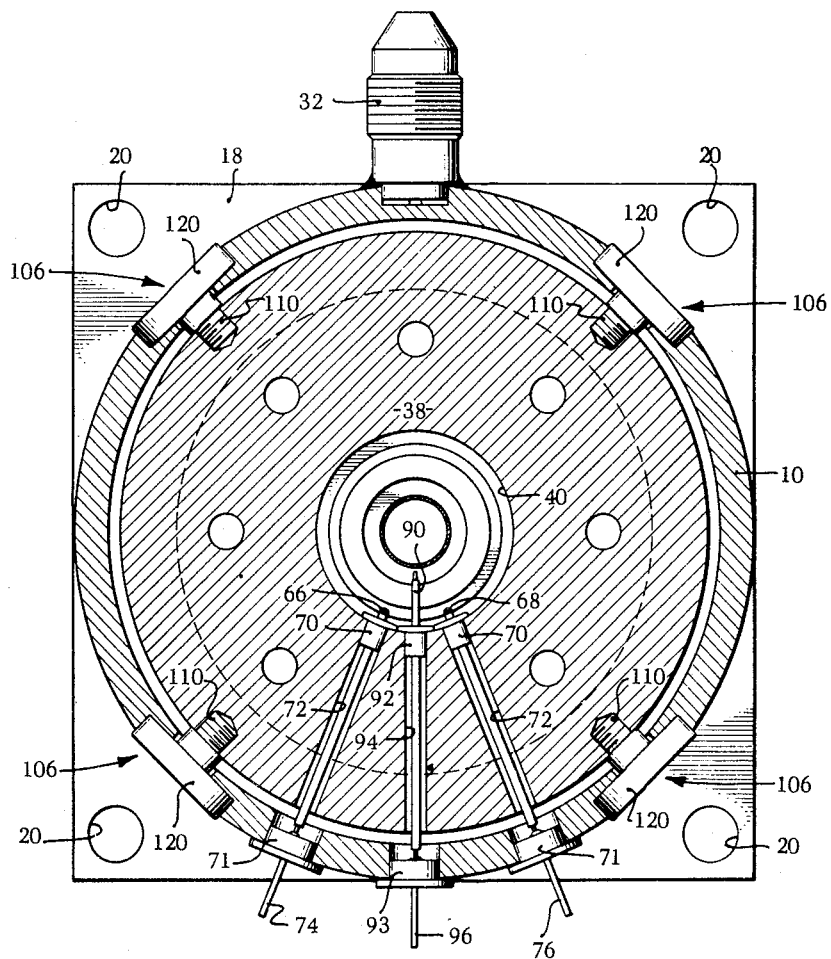
Figure 2 is a sectional view taken at 2—2 in Figure 1.
Figure 3 is an enlarged fragmentary sectional view taken through one of the elastic mounts connecting the central support member to the case.

Disposed centrally within the aneroid capsules 40, 42 and mounted on the ring members 54 and 56, respectively, are a resistance element 58 and a wiper 60. The element 58 is preferable formed as a cup-shaped body 62 of dielectric plastic or ceramic material, and adhering to the inner surface of the cavity in the body are windings 64 of resistive wire. The ends of the wire windings 64 are connected to terminal wires 66 and 68 (see Fig. 2) which pass through seals 70 and 71, and through angularly spaced, radial holes 72 in the support member 38, to external solder terminals 74 and 76.

The wiper 60 is preferably in the form of a tubular sleeve 78 of conductive sheet metal, one end of which is inserted over and welded or brazed to a cylindrical boss on a threaded base member 80. The other end of the sleeve 78 is slit to form a plurality of spring fingers 82 having outwardly turned tip ends which contact the wire windings 64 around a 360° line of contact in a plane normal to the longitudinal axis of the cylindrical windings 64. The base member 80 is screwed into an internally threaded ring 84 and is securely locked in place therein by a locking disc 86. Cemented to the outer surface of the ring 84 is a generally cup-shaped insulator 88 which is cemented, in turn, to the inner surface of ring member 56. A terminal wire 90 is inserted into a hole 91 in the base member 80 and is soldered thereto. The terminal wire 90 passes out through seals 92 and 93, and through a radial hole 94 in the support member 38 to external terminal 96.

The cup-shaped resistance element body 62 is seated within the ring member 54, and to this end is provided with an inwardly facing annular shoulder 98 which seats against an inwardly projecting flange 99 at the inner end of the ring member. The outer end of the ring member 54 is threaded at 100 and screwed into this threaded portion is a locking disc 101, which clamps the body member 62 tightly against the flange 99.

In the preferred form of the invention illustrated herein, the resistance element 58 and wiper 60 are enclosed within a pair of bellows 102 and 104 which are attached to opposite sides of the support member 38 adjacent the aperture 40, and extend outwardly therefrom in opposite directions. At their outer ends, the bellows 102 and 104 are attached to the ring members 54 and 56, respectively. The bellows 102, 104 thus form a sealed enclosure in which the resistance element 58 and wiper 60 are isolated from the remainder of the interior of the aneroid capsules 40 and 42.

The advantage of this arrangement is that it permits the interior of the bellows 102, 104 to be filled with air or some dry, inert gas, such as nitrogen, at any desired pressure, while the remainder of the interior of the capsules 40 and 42 is either evacuated to a high vacuum, as for an absolute pressure transducer, or is filled with some fluid pressure media as in the case of a differential pressure transducer. By thus maintaining the resistance element and wiper under some gaseous pressure, corona discharge or other electrical leakage between the element or wiper and the case is eliminated. Such corona discharge is fairly common with electrical equipment operating in a high vacuum, and causes disturbances in the electrical output of the equipment. The element and wiper are also protected from contamination and from corrosion. Another advantage of filling the bellows 102, 104 with air or other gas is that the thermal expansion of the gas bucks the thermal expansion of the fluid in the case, and by carefully calculating the volume of air necessary to counteract the thermal expansion of the fluid pressure media, it is possible to obtain zero shift of the wiper with respect to the element due to temperature change within a given temperature range.

One of the important features of the present invention is its freedom from vibration and acceleration error. This is achieved by (1) dynamically balancing the two aneroid capsules 40 and 42 so that they vibrate synchronously, and (2) by the use of vibration isolators interposed between the case 10 and the center support member 38, which acts to absorb a substantial portion of the vibration energy at the resonant frequency of the bellows, so that the amount of vibration energy transmitted to the center support member 38 and aneroid capsules 40, 42 at the resonant frequency of the latter is greatly attenuated.

In the illustrative embodiment, four vibration isolators are spaced equidistantly around the perimeter of the center support member 38 and are designated by the reference numeral 106. Each of the vibration isolators 106 consists of a screw 108 having a threaded portion 110 which is screwed into a tapped hole in the center support member 38. The threaded portion 110 extends for about one-half the length of the screw 108 and terminates at a shoulder 112 (see Figure 3) which is drawn up tightly against the outer surface of the member 38. The remainder of the screw above the shoulder 112 is a smooth, shank portion 114 of somewhat larger diameter than the threaded portion 110, and at its outer end is a slotted head 116. The shank portion 114 of the screw extends through an enlarged hole 118 and counterbore 119 in the case 10, and the upper end of the shank 114 and head 116 are received within a centrally apertured, cup-shaped cushion member 120 of soft elastomeric material, such as neoprene. Thus, it will be seen that the center support member 38 is resiliently supported on the case 10 by the four screws 108 and cushion member 120.

The cushion member 120 must be of a softness such that the resonant frequency of the member 38 with its attached structure is quite low relative to the resonant frequency of the aneroid capsules. For example, in an instrument having a pressure range of from 0 to 100 p.s.i., the resonant frequency of the aneroid capsules 40, 42 might be in the neighborhood of 900 c.p.s., in which case a resonant frequency of approximately 150 c.p.s. would be indicated for the member 38 on its resilient vibration isolators 106. As the instrument is vibrated through the resonant frequency range of the support member 38, the amplitude of the vibrational movement transmitted to the member 38 is multiplied several times by the resonance of the spring-mass assembly 38, 106, and the aneroid capsules 40, 42 are set into synchronous vibration at the same frequency. While the vibration amplitude of the aneroid capsules 40, 42 is considerable, the fact that they are dynamically balanced to vibrate synchronously means that there is no relative movement between the wiper 60 and the resistance element 58, and therefore there is no appreciable vibration error in the electrical output of the instrument in this vibration range.

As the vibration to which the instrument is submitted reaches a frequency of perhaps twice the resonant frequency of the spring-mass assembly 38, 106 (300 c.p.s., for example) the amplitude of vibration transmitted to the member 38 drops below unity and begins to diminish further, owing to absorption of vibration energy by the cushion member 120. As the vibration approaches the resonant frequency (900 c.p.s., for example) the amount of energy absorbed by the cushion member 120 becomes a relatively large proportion of the total vibration energy applied to the case 10, with the result that the amplitude of the member 38 may be down to 20% or less of the amplitude of the case. At this low vibration amplitude of the member 38, the resonance amplitude of the aneroid capsules is held down to a tolerable value, with the result that the synchronous vibration of the dynamically balanced aneroid capsules produces no appreciable vibration error in the electrical output of the instrument.

An instrument embodying the principles of the present invention and having an operating range of from 0–100 p.s.i., has been vibrated at 25 G acceleration through the resonant frequency of the aneroid capsules, with a total vibration error of ±.6%, which is an extremely small error under such severe conditions. Similar results have been obtained with instruments having ranges of 0–50 p.s.i., 0–20 p.s.i., and 0–10 p.s.i., in which cases the resonant frequencies of the aneroid capsules were approximately 700 c.p.s., 450 c.p.s., and 380 c.p.s., respectively. For the lower resonant frequency, it would be desirable to use the softest possible vibration isolator cushions 120, so as to reduce the resonant frequency of the spring-mass assembly 38, 106 to the lowest possible value.

It is believed that the operation and advantages of the present invention are clearly apparent from the foregoing description. While we have shown an absolute pressure transducer to illustrate the principles of the invention, it will be understood by those skilled in the art that the same principles might be applied to a differential pressure transducer, in which case, a flexible conduit would be connected to the interior of the aneroid capsules 40, 42 so as to permit introduction of fluid pressure media to the inside of the capsules. The flexible conduit would necessarily have allowance for accommodating the vibration of the center support member 38 with respect to the case 10, just as the wires 66, 68 and 90 permit movement of the center support member 38 relative to the case 10. Other variations in the shape and arrangement of the several parts will occur to those skilled in the art which come within the scope of the appended claims.

We claim:

1. A fluid pressure transducer comprising a case, a support member mounted within said case, a pair of flexible diaphragm means attached to opposite sides of said support member, said flexible diaphragm means and said support member cooperating to define an expansible chamber, means for introducing fluid pressure media into said case, a resistance element attached to and movable with one of said flexible diaphragm means, a wiper attached to and movable with the other of said flexible diaphragm means, both said resistance element and said wiper being disposed within said expansible chamber, said one flexible diaphragm means and its attached resistance element being dynamically balanced to vibrate in synhcronism with said other flexible diaphragm means and its attached wiper, and terminal means connected to said element and to said wiper and extending through said support member to the exterior of said case.

2. A fluid pressure transducer comprising a case, an apertured support member mounted within said case, a pair of flexible bellows attached to opposite sides of said support member and extending outwardly therefrom, said bellows being interconnected by the aperture in said support member, means for introducing fluid pressure media into said case, a resistance element attached to and movable with the free end of one of said bellows, a wiper attached to and movable with the free end of the other of said bellows, both said resistance element and said wiper being disposed within said bellows and being movable in opposite directions as said bellows expand and contract, and terminal means connected to said element and to said wiper and extending through said support member to the exterior of said case.

3. The invention as defined in claim 2, wherein said one bellows and its attached resistance element is dynamically balanced so as to vibrate in synchronism with said other bellows and its attached wiper, the free ends of said bellows moving simultaneously in the same direction and through the same amplitude when said case is vibrated, thereby substantially eliminating movement of said wiper relative to said resistance element due to vibration.

4. A fluid pressure transducer comprising a case, an apertured support member mounted within said case, a pair of flexible bellows attached to opposite sides of said support member and extending outwardly therefrom, said bellows being interconnected by the aperture in said support member, means for introducing fluid pressure media into said case, an internally wound cylindrical resistance element attached to and movable with the free end of one of said bellows, a wiper attached to and movable with the free end of the other of said bellows, said wiper comprising a plurality of spring fingers arranged in a generally cylindrical configuration and making contact with the inside of said cylindrical resistance element around a substantially full circle in a plane perpendicular to the longitudinal axis of the cylindrical resistance element, both said resistance element and said wiper being disposed within said bellows and being movable in opposite directions as said bellows expand and contract, and terminal means connected to said element and to said wiper and extending through said support member to the exterior of said case.

5. The invention as defined in claim 4, wherein said one bellows and its attached resistance element is dynamically balanced so as to vibrate in synchronism with said other bellows and its attached wiper, the free ends of said bellows moving simultaneously in the same direction and through the same amplitude when said case is vibrated, thereby substantially eliminating movement of said wiper relative to said resistance element due to vibration.

6. A fluid pressure transducer comprising a case, a centrally apertured support member in said case, flexible bellows means attached to opposite sides of said support and extending outwardly therefrom in opposite directions, said bellows means being interiorly connected through said support member, a second bellows means contained within said first-named bellows means and connected at its outer ends to the outer ends of said first-named bellows means, the interior of said second bellows means being isolated from the interior of said first-named bellows means, means for producing a fluid pressure difference between the interior and exterior of said first-named bellows means, a resistance element and an associated wiper disposed within said second bellows means, said resistance element being attached to and movable with the free end of one of said first-named bellows means, said wiper being attached to and movable with the free end of the other of said first-named bellows means, said element and said wiper being movable in opposite directions as said bellows expand and contract, and terminal means connected to said element and to said wiper and extending to the exterior of said case.

7. The invention as defined in claim 6, wherein said second bellows means is filled with gas of such volume that the thermal expansion of the gas due to temperature change acts to oppose and counterbalance the effect of thermal expansion of the fluid pressure media contained between said case and said first-named bellows means, so as to prevent relative movement between said resistance element and said wiper due solely to temperature change.

8. A fluid pressure transducer comprising a case, a support member disposed within said case, bellows means attached to said support member, a resistance element and a wiper element, at least one of said elements being operatively connected to said bellows means so as to be moved thereby relative to the other element, means for producing a fluid pressure difference between the outside and inside of said bellows means, and resilient vibration isolator means connecting said support member to said case, the resonant frequency of said support member and its associated parts on said resilient vibration isolator means being considerably lower than the resonant frequency of said bellows means, and said vibration isolator means absorbing a substantial portion of the vibration energy transmitted from said case to said support member at the resonant frequency of said bellows means, thereby minimizing the amplitude of vibration of said support member and said bellows means at the resonant frequency of the latter.

9. A fluid pressure transducer comprising a case, a centrally apertured support member disposed within and spaced from said case, a pair of bellows attached to opposite sides of said support member, said bellows being interconnected by the aperture in said support member, means for introducing fluid pressure media into said case, a resistance element attached to and movable with the free end of one of said bellows, a wiper attached to and movable with the free end of the other of said bellows, both said resistance element and said wiper being disposed within said bellows and being movable in opposite directions as said bellows expand and contract, said bellows being dynamically balanced so as to vibrate in synchronism, and resilient vibration isolator means connecting said support member to said case, the resonant frequency of said support member and its associated parts on said resilient vibration isolator means being considerably lower than the resonant frequency of said bellows, and said vibration isolator means absorbing a substantial portion of the vibration energy transmitted from said case to said support member at the resonant frequency of said bellows means, thereby minimizing the amplitude of vibration of said support member and said bellows means at the resonant frequency of the latter.

10. A fluid pressure transducer comprising a case, a centrally apertured support member mounted within said case, a pair of flexible bellows attached to opposite sides of said support member and extending outwardly therefrom, said bellows having their interiors interconnected so that both bellows are exposed to the same internal pressure, other bellows means attached to and extending between the outer ends of said first mentioned pair of bellows, said other bellows means being sealed so that the interior thereof is isolated from the interior of said first mentioned pair of bellows, a resistance element and wiper disposed within said other bellows means, said resistance element being attached to the free end of one of said first mentioned pair of bellows, said wiper being attached to the free end of the other of said first mentioned pair of bellows, and terminal means connected to said resistance element and to said wiper.

References Cited in the file of this patent

UNITED STATES PATENTS 2,622,177     Klose     Dec. 16, 1952